United States Patent
Endo

(10) Patent No.: US 8,040,380 B2
(45) Date of Patent: Oct. 18, 2011

(54) IMAGE-TAKING APPARATUS

(75) Inventor: Hiroshi Endo, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 448 days.

(21) Appl. No.: 12/171,007

(22) Filed: Jul. 10, 2008

(65) Prior Publication Data

US 2009/0021616 A1 Jan. 22, 2009

(30) Foreign Application Priority Data

Jul. 20, 2007 (JP) ................. 2007-189615

(51) Int. Cl.
*H04N 5/228* (2006.01)
*G03B 17/00* (2006.01)

(52) U.S. Cl. .................... 348/208.4; 396/52

(58) Field of Classification Search .. 348/208.1–208.11, 348/294, 371; 396/52, 55
See application file for complete search history.

(56) References Cited

U.S. PATENT DOCUMENTS

| | | | |
|---|---|---|---|
| 7,538,794 B2 * | 5/2009 | Turley et al. | 348/208.1 |
| 7,580,620 B2 * | 8/2009 | Raskar et al. | 396/55 |
| 7,755,664 B2 * | 7/2010 | Kakinuma et al. | 348/208.1 |
| 2007/0098383 A1 * | 5/2007 | Stavely et al. | 396/55 |

FOREIGN PATENT DOCUMENTS

| | | |
|---|---|---|
| JP | 4-309078 A | 10/1992 |
| JP | 11-252445 A | 9/1999 |
| JP | 2000-341577 A | 12/2000 |
| JP | 2006-130159 A | 5/2006 |
| JP | 2006-135501 A | 5/2006 |

* cited by examiner

*Primary Examiner* — Trung Diep
(74) *Attorney, Agent, or Firm* — Sughrue Mion, PLLC

(57) ABSTRACT

In response to a release button being pushed, a system control section informs a timing generation section of the number of images to be shot to carry out high-speed continuous shooting. A first image obtained by continuous shooting is stored in a frame memory of an imaging section. While a superimposed image based on continuously shot images is generated by a camera-shake correction section, the first image stored in the frame memory is output to a preprocessing section so that the preprocessing section generates a high-sensitivity image by increasing the gain of an amplifying circuit in the preprocessing section. A signal processing section reads the superimposed image generated by the camera-shake correction section and the high-sensitivity image generated by the preprocessing section and applies image processing to these two images. The system control section causes a recording/reproducing section to record the two images in a recording medium.

8 Claims, 13 Drawing Sheets

IMAGE-TAKING APPARATUS

FIELD OF THE INVENTION

The present invention relates to an image-taking apparatus that includes an imaging device and generates image signals by forming an image on the imaging device.

DESCRIPTION OF THE RELATED ART

Many of recent digital cameras are provided with a camera-shake correction function. There are mainly two types of structures that realize the camera-shake correction function, which are an optical type and an electronic type. The optical type corrects camera shake by moving a lens or an imaging device, while the electronic type corrects camera shake by superimposing sequentially shot images on each other such that the positions of the images match each other. The electronic type have such a drawback that a shake occurring during 1/30 second cannot be corrected because most of imaging devices have a frame rate of 30 frames per second. In recent years however, an imaging device having a high-speed frame rate of 1.2-Mbyte 300 frames per second have been developed by Sony Corporation, and use of this type of imaging device makes it possible to overcome the above-mentioned drawback.

When the imaging device having a high-speed frame rate, which is one of the electronic type, is employed, camera shake is corrected by using its camera-shake correction function such that high-speed continuous shooting is carried out with a single shooting operation, a movement vector is detected per each of sequentially shot images, and blurring due to the difference between images is corrected based on the movement vector. At the time, since the entire imaging area on the imaging device cannot be used, a predetermined size of small recording area relative to the entire imaging area of the imaging device is set, and the shot images are superimposed on each other such that the small recording areas of the respective shot images match each other (see, for example, Japanese Patent Application Publications No. 11-252445, No. 2000-341577, and No. 2006-130159).

The techniques disclosed in Japanese Patent Application Publications No. 11-252445, No. 2000-341577, and No. 2006-130159 are able to correct blurring due to camera shake, but they cannot suppress blurring due to the movement of a subject. Increasing shutter speed by raising the shooting sensitivity is an effective way to suppress a blur caused by the movement of a subject, although noise may be increased to some extent. For example, the technique disclosed in Japanese Patent Application Publication No. 4-309078 may be employed. In this technique, whether a target to be photographed is a moving subject or a stationary subject is determined before shooting and when it is determined that the subject is moving, the sensitivity is increased and shooting is carried out based on the increased sensitivity, so that an image where blurring due to a subject's movement is suppressed can be obtained.

However, according to these techniques, even when the amount of movement of the subject during shooting is small, it is determined before shooting that the subject is moving, which results in an image with noise that has been unnecessarily increased according to an increase in sensitivity. In such a case, however, the technique disclosed in Japanese Patent Application Publication No. 2006-135501 may be employed. In this technique, continuous shooting is controlled such that the interval between shootings is reduced and a superimposed image is generated based on the reduced interval so as to obtain an image in which blurring due to camera shake as well as blurring due to a subject's movement are suppressed. Nevertheless, even if the shooting interval is reduced to correct both blurring due to camera shake and blurring due to subject's movement by employing the technique of Japanese Patent Application Publication No. 2006-135501, the amount of the entire movement becomes larger as the shooting duration becomes longer and thus, influence of subject's movement starts appearing.

SUMMARY OF THE INVENTION

The present invention has been made in view of the above circumstances and provides an image-taking apparatus capable of reliably obtaining an image in which blurring due to a subject's movement has been suppressed or an image in which blurring due to camera shake has been corrected, depending on the photographed scene.

A first image-taking apparatus according to the present invention is an image-taking apparatus that generates an image representing a subject by using an imaging device, the image-taking apparatus including:

a shooting section that generates an image by shooting;

a shooting control section that causes the shooting section to generate a plurality of continuously shot images in response to a shooting operation;

a superimposing section that superimposes the plurality of images of relatively low sensitivity shot by the shooting section on each other so that blurring is corrected, thereby generating one superimposed image;

a high-sensitivity image generation section that generates one of the plurality of images shot by the shooting section, which is an image of relatively high sensitivity; and an image recording section that records both the superimposed image generated by the superimposing section and the image of high sensitivity generated by the high-sensitivity image generation section.

According to the first image-taking apparatus of the present invention, two or more shot images are obtained in shooting by the shooting section under the control of the shooting control section. The superimposing section generates one superimposed image based on these two or more images, while the high-sensitivity image generation section generates a high sensitivity image, and the image recording section records both the superimposed image and the high sensitivity image.

Therefore, a photographer can select either the high sensitivity image in which blurring due to a subject's movement is corrected or the superimposed image of relatively low sensitivity in which blurring due to camera shake is corrected. In other words, when a scene including a moving subject which is very likely to cause blurring due to the movement of the subject is photographed, the photographer can later select the high sensitivity image so as to obtain an image in which blurring due to a subject's movement is suppressed. In contrast, when a scene including a stationary subject or a slightly moving subject is photographed, the photographer can later select the superimposed image so as to obtain a clear image in which blurring due to camera shake is corrected.

It is preferable that the image-taking apparatus of the present invention further includes a subject determination section that determines whether a subject is moving or stationary, and the image recording section records both the superimposed image and the image of high sensitivity when it is determined by the subject determination section that the subject is moving, and records only the superimposed image when it is determined by the subject determination section that the subject is stationary.

This additional feature makes it possible to automatically record only the superimposed image when the subject is stationary, thereby preventing unnecessary recording.

Incidentally, increasing the shooting sensitivity may be replaced by the shooting with flash.

A second image-taking apparatus according to the present invention is an image-taking apparatus that generates an image representing a subject by using an imaging device, the image-taking apparatus including:

a flash that emits light toward a subject;

a shooting section that generates an image by shooting;

a shooting control section that causes the shooting section to generate a plurality of continuously shot images and causes the flash to emit light in synchronism with shooting of any one of the plurality of images, in response to a shooting operation;

a superimposing section that superimposes the plurality of images shot by the shooting section except for an image obtained by shooting with the flash on each other so that blurring is corrected, thereby generating one superimposed image; and an image recording section that records both the superimposed image generated by the superimposing section and the image obtained by shooting with the flash.

According to the second image-taking apparatus of the present invention, it is possible to obtain two ore more shot images by causing the shooting section to shoot under the control of the shooting control section. Based on these two or more shot images, the superimposing section generates on superimposed image and one flash-based shot image, both of which are recorded.

Therefore, a photographer can select either the flash-based shot image in which blurring due to a subject's movement is corrected or the superimposed image of relatively low sensitivity in which blurring due to camera shake is corrected. In other words, when a scene including a moving subject which is very likely to cause blurring due to the movement of the subject is photographed, the photographer can later select the flash-based shot image so as to obtain an image in which blurring due to a subject's movement is suppressed. In contrast, when a scene including a stationary subject or a slightly moving subject is photographed, the photographer can later select the superimposed image so as to obtain a clear image in which blurring due to camera shake is corrected.

Here, the image-taking apparatus according to the present invention may further include a subject determination section that determines whether a subject is moving or stationary, and the image recording section may record both the superimposed image and the image obtained by shooting with the flash when it is determined by the subject determination section that the subject is moving, and record only the superimposed image when it is determined by the subject determination section that the subject is stationary.

This additional feature makes it possible to automatically record only the superimposed image when the subject is stationary, thereby preventing unnecessary recording.

Further, the subject determination section may determine whether a subject is moving or stationary by detecting a movement vector based on a moving image before shooting. Alternatively, the subject determination section may detect whether a face is included in a subject, and determines that the subject is moving when the face is included and that the subject is stationary when the face is not included.

Furthermore, the image-taking apparatus according to the present invention may further include a movement-vector calculation section that calculates a movement vector based on a plurality of shot images obtained by the shooting section, and the superimposing section may superimpose a plurality of images obtained by a single shooting operation on each other based on the movement vector calculated by the movement-vector calculation section so that blurring is corrected. Alternatively, the image-taking apparatus according to present invention may further include an angular velocity sensor that detects an angular velocity of the image-taking apparatus, and the superimposing section may superimpose a plurality of images obtained by a single shooting operation on each other based on the angular velocity detected by the angular velocity sensor so that blurring is corrected.

As described above, according to the present invention, there is realized an image-taking apparatus capable of reliably obtaining an image in which blurring due to a subject's movement has been suppressed or an image in which blurring due to camera shake has been corrected, depending on the photographed scene.

BRIEF DESCRIPTION OF THE DRAWINGS

FIG. 4(*b*) is a flowchart showing the details of image processing in step S406 shown in FIG. 4(*a*);

FIG. 6(*b*) is another flowchart showing the third embodiment;

FIG. 10(*b*) is another flowchart showing the fifth embodiment.

DETAILED DESCRIPTION OF THE INVENTION

Figure 1:
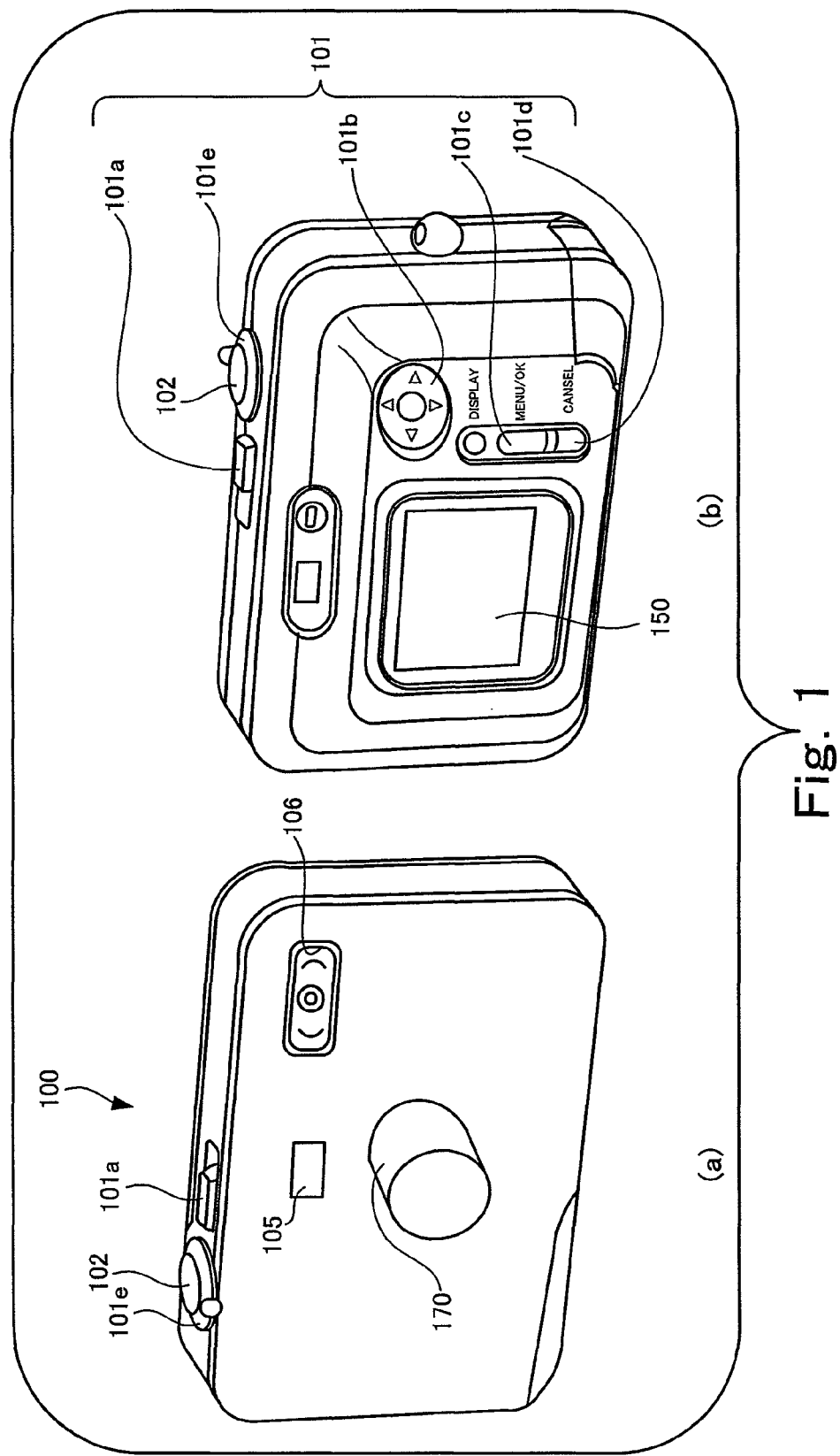
FIG. 1 is a diagram showing a digital camera which is a first embodiment of the image-taking apparatus according to the present invention.

FIG. 1 is a diagram showing the structure of a digital camera 100 which is a first embodiment of the image-taking apparatus according to the present invention. FIG. 1 shows a perspective view of the digital camera 100. Specifically, part (a) of FIG. 1 shows the front of the digital camera 100 while part (b) of FIG. 1 shows the back of the digital camera 100 both as viewed obliquely from above.

As shown in part (a) of FIG. 1, a lens barrel 170 is disposed in the middle of the body of the digital camera 100 according to the present embodiment. A finder 105 is disposed above the lens barrel 170. Also, a fill-light emission window 106 is disposed beside the finder 105. The digital camera 100 of the present embodiment has a flash incorporated therein that emits light toward a subject through the fill-light emission window 106.

Also, as shown in part(b) of FIG. 1, on a top face and a back face of the digital camera 100 of the present embodiment, an operation section 101 is provided to be handled by a user for performing various operations using the digital camera 100.

The operation section 101 includes a power switch 101a, a cross key 101b, a menu/OK key 101c, a cancel key 101d, and a mode lever 101e for operating the digital camera 100. The mode lever 101e of the operation section 101 switches between a playback mode and a shooting mode, and further switches between a moving image mode and a still image mode in the shooting mode. When the power switch 101a is turned on while the mode lever 101e is switched to the shooting mode, a moving image (an image continuously displayed while being captured by a shooting lens and hereinafter referred to as "through image") is displayed on an LCD 150. When a user pushes a release button 102 while watching the through image, shooting an image of a subject is performed. The digital camera 100 of the present embodiment has a camera-shake correction section to electronically correct blurring and is configured to correct blurring by means of the camera-shake correction section. The details will be described later.

Incidentally, when the mode lever 101e is switched to the playback mode, a shot image is reproduced and displayed on the LCD 150. In addition, the release button 102 provided in the digital camera 100 of the present embodiment has two operation modes, a half press and a full press. In response to a half press of the release button 102, photometric measurement and distance measurement are carried out so that aperture and shutter speed are set according to the measured photometric value and a focus lens is placed at a focus position according to the measured distance to the subject. Subsequently, in response to a full press, a shutter is driven at the set shutter speed and exposure is performed in the imaging device. In addition, the digital camera of the present embodiment has two types of shutters: one is a mechanical shutter and the other is an electronic shutter provided in the imaging device. The mechanical shutter is used when the shutter speed is low, whereas the electronic shutter is used when the shutter speed is too high to drive with the mechanical shutter. A still image is taken with the mechanical shutter to prevent smear or the like, while a through image is taken with the electronic shutter although the mechanical shutter may also be used. In the following descriptions, in order to distinguish a through image serving like a finder from an image obtained by shooting, the latter image, which is obtained by shooting in response to a full press of the release button 102, is referred to as a "main image."

Figure 2:
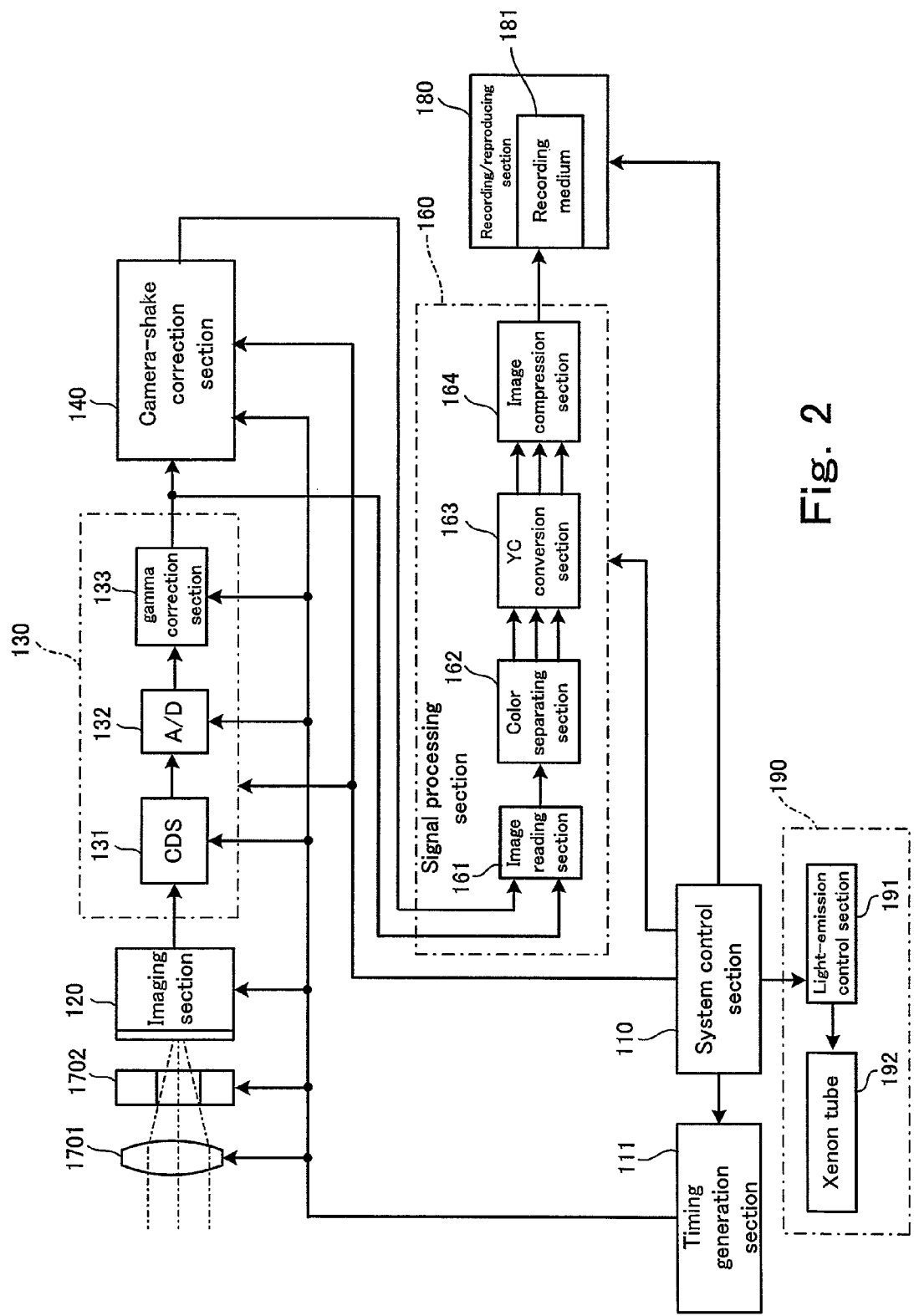
FIG. 2 is a block diagram showing an electric system of the digital camera shown in FIG. 1.

FIG. 2 is a block diagram showing an electric system of the digital camera 100 of FIG. 1.

Referring to FIG. 2, the internal structure and operation of the digital camera 100 will be briefly described.

The digital camera 100 shown in FIG. 2 has an optical lens system 1701, a timing generation section 111, a system control section 110, an aperture adjusting mechanism 1702, an imaging section 120, a preprocessing section 130, a camera-shake correction section 140, a signal processing section 160, a recording/reproducing section 180, and a flash 190. The digital camera 100 also has the above-mentioned mechanical shutter although it is omitted in FIG. 2.

The configuration of each of these elements will be described.

The optical lens system 1701 is formed by, for example, a combination of plural optical lenses such as a focus lens and a zoom lens. The optical lens system 1701 includes, although not shown in FIG. 2, a zoom mechanism for adjusting the position of a zoom lens in the optical lens system to adjust a focal length and an Automatic Focus (AF) adjusting mechanism for adjusting the position of a focus lens in the optical lens system to adjust focus. These mechanisms are driven according to driving signals generated by the timing generation section 111.

The timing generation section 111 has a built-in clock producing section that produces a system clock in the digital camera 100. Further, the timing generation section 111 includes a timing signal generation section that generates a timing signal in synchronism with the system clock and a driving signal generation section that generates a driving signal in synchronism with the system clock. In response to supply of a control signal from the system control section 110, the timing signal generation section 111 outputs, according to the control signal, a timing signal to the imaging section 120, the preprocessing section 130, and further to the driving signal generation section in the timing signal generation section 111. In response to the timing signal, the driving signal generation section in the timing signal generation section 111 outputs driving signals to the zoom mechanism and the AF adjusting mechanism described above. Incidentally, the flash 190 is provided with a xenon tube 192, and light emitted from the xenon tube 192 is controlled by a light-emission control section 191. Therefore, the system control section 110 also supplies a control signal to the light-emission control section 191.

The system control section 110 that supplies a control signal to the timing generation section 111 is equipped with, for example, a CPU (Central Processing Unit) and a ROM in which the procedure describing the operation of the digital camera 100 is written. The system control section 110 generates a control signal for controlling the operation of each section, based on information supplied from the operation section 101 (including the release button 102) in accordance with a user's operation and information from the ROM. The generated control signal is then supplied to the timing generation section 111, the preprocessing section 130, the camera-shake correction section 140, the signal processing section 160, the recording/reproducing section 180, the flash 190 and the like. The control signal supplied to the flash 190 represents the amount of light to be emitted from the flash 190, and the light-emission control section 191 controls light emission of the xenon tube 192 based on the control signal.

The aperture adjusting mechanism 1702 disposed behind the optical lens system 1701 adjusts the cross-section area of an incident light flux (i.e. aperture) to supply an optimum light flux to the imaging device at the time of shooting an image of a subject. A driving signal is supplied to the aperture adjusting mechanism 1702 from the timing generation section 111. Although not shown in the figure, the driving signal is generated based on the aperture and exposure time that are calculated by the system control section 110 after AE (Automatic Exposure) processing is performed based on a signal charge that has been subjected to photoelectric conversion in the imaging section 120. The system control section 110 supplies the control signal according to the aperture and exposure time to the timing generation section 111, thereby causing the driving signal generation section in the timing generation section 111 to generate a driving signal.

In addition, the imaging section 120 has a photoelectric converting imaging device that is disposed to be perpendicular to the optical axis of the optical system. At the incident side of the imaging device, color filters that separate colors corresponding to respective photoelectric transducers are arranged two dimensionally. In response to a timing signal from the timing generation section 111, photoelectric conversion is performed in the imaging device. A signal charge obtained by the photoelectric conversion is output to the preprocessing section 130 in response to a predetermined timing signal, e.g.

a timing signal representing the time when the electronic shutter is turned off. In the present embodiment, when the digital camera 100 shown in FIG. 1 is set to the shooting mode, the imaging device starts shooting a through image by decreasing the number of pixels. Subsequently, when the release button is pressed fully (all the way) during shooting, the imaging device stops the shooting of a through image to start shooting a main image to be recorded. Although the details will be described later, the imaging device shown in FIG. 2 has a high-speed frame rate, and when high-speed continuous shooting is performed by a single shooting operation in response to a full press of the release button 102, the camera-shake correction section 140 (described later) electronically corrects camera shake during the shooting of a main image. Therefore, in the following description of the high-speed continuous shooting by a single shooting operation, images obtained by the high-speed continuous shooting are referred to as "continuously-shot images." Further, the "continuously-shot images" may be represented by the number of shooting times. For example, among the continuously-shot images, an image obtained at the first shooting is referred to as a first image obtained by continuous shooting, and an image obtained at the second shooting is referred to as a second image obtained by continuous shooting. When high-speed continuous shooting is performed to electronically correct blurring, shooting is repeated for the number of times according to the shutter speed so that blurring is electronically corrected. An image obtained after correction of blurring is a main image.

In addition, the preprocessing section 130 includes a Correlated Double Sampling (CDS) 131, an A/D section 132 and a gamma correction section 133. The CDS 131 is provided with a clamping circuit and a sample-hold circuit. For example, when a CCD solid-state imaging device is used as the imaging section 120, various noises generated due to operation of the CCD solid-state imaging device are removed by the clamping circuit and the sample-hold circuit in response to timing signals generated by the timing generation section 111. The CDS 131 is also provided with an amplifying circuit that amplifies an input signal by a gain according to a control signal provided by the system control section 110. A signal charge output from the sample-hold circuit after removal of various noises is changed to precise color signals (R, G, B) that represent the amount of received light and then supplied to the amplifying circuit. The amplifying circuit amplifies the input color signals by a predetermined gain. Subsequently, the amplified color signals are sent to the A/D section 132 where the color signals are quantized at a predetermined quantization level and converted into digital signals. When a control signal representing a high gain for increasing the shooting sensitivity is supplied from the system control section 110, the amplifying circuit amplifies signals by the high gain, which is higher than the predetermined gain, and the amplified signals are supplied to the A/D section 132 where the color signals are quantized at a predetermined quantization level and converted into digital signals. At this time, conversion into a digital signal is performed in response to a timing signal generated by the timing generation section 111.

Further, the gamma correction section 133 has a look-up table for gamma correction. The gamma correction section 133 applies gamma correction to digital signals according to the look-up table and coverts the digital signals after the gamma correction into color signals which are then supplied to the camera-shake correction section 140.

Here, the configuration of the camera-shake correction section 140 will be described with reference to FIG. 3.

Figure 3:
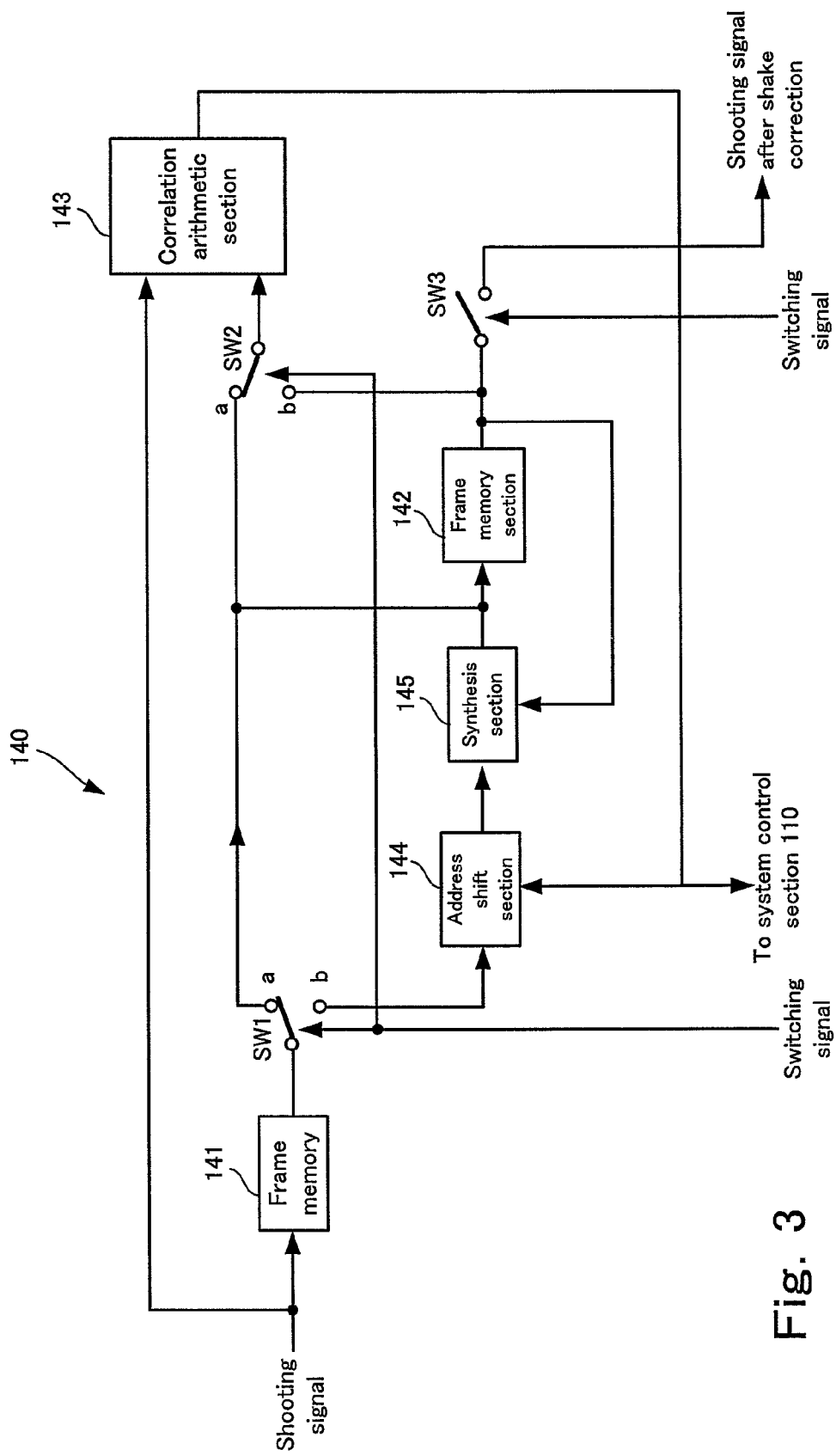
FIG. 3 is a diagram showing a configuration of a camera-shake correction section 140.

FIG. 3 is a diagram showing a configuration of camera-shake correction section 140.

The camera-shake correction section 140 shown in FIG. 3 has a frame memory 141, a frame memory section 142, a correlation arithmetic section 143, an address shift section 144, a synthesis section 145 and three switches SW1 through SW3. In this example, as each of the frame memory 141 and the frame memory section 142, there is employed a non-destructive type of memory which has a size capable of storing color signals of R, G, and B for one frame and from which signals can be read repeatedly.

Referring to FIG. 3, the configuration of the camera-shake correction section 140 will be described sequentially from an input side.

At first, operation of the camera-shake correction section 140 for displaying a through image will be described.

In the process of displaying a through image, the imaging section 120 outputs image signals representing a through image every 1/30 second (or 1/60 second) by dropping the pixel number of the imaging device. Subsequently, the image signals are subjected to preprocessing in the preprocessing section 130 and then supplied to the camera-shake correction section 140.

In the camera-shake correction section 140 shown in FIG. 3, whether a subject is moving or stationary is determined by the correlation arithmetic section 143, based on the through image represented by the sequentially received signals.

When a through image is displayed, the switches SW1 and SW2 are both turned to the side "a," the switch SW3 remains connected, and the through-image signals representing the previous image and the through-image signals representing the current image are continuously supplied to the correlation arithmetic section 143 so that whether the subject is moving or stationary is continuously determined. The result of the determination is supplied to the system control section 110, and the through-image signals temporarily stored in the frame memory section 142 are read by the signal processing section 160 per 1/30 second.

The signal processing section 160 applies color separation and YC conversion processing to the image signals representing the through image, which are then supplied to an image display section (not shown) so that the through image is displayed on the LCD 150 (see FIG. 1).

When the release button 102 is pressed while the through image is displayed, the system control section 110 causes the imaging section 120 to start high-speed continuous shooting by instructing the timing generation section 111 to continuously supply timing signals for the number of shots based on the shutter speed obtained by AE processing. The imaging section 120 sequentially outputs shot images to the preprocessing section 130 where processing such as conversion to digital signal is carried out for each of the shot images. Subsequently, the signals representing the shot images are sequentially supplied to the camera-shake correction section 140. Incidentally, at this point, the first image obtained by the continuous shooting is stored in a frame memory (not shown) in the imaging section 120. Subsequently, after all the images obtained by the continuous shooting are output from the preprocessing section 130 to the camera-shake correction section 140, the system control section 110 increases the gain of the amplifying circuit in the preprocessing section 130 and causes the frame memory (not shown) in the imaging device 120 to output the image to the preprocessing section 130. The system control section 110 then causes the amplifying circuit to amplify the image signals representing the image by using the increased gain so that a high-sensitivity image is generated. The generated image is then stored in a frame memory (not shown) provided in the last stage of the preprocessing section 130.

On the other hand, in the camera-shake correction section 140 (see FIG. 3), electronic blurring correction is applied to the continuously shot images that are supplied from the preprocessing section 130 one after another. At first, when the first and second shootings of the continuous shooting performed in response to one push of the release button 102 are obtained, the first and second shot images are input to the correlation arithmetic section 143.

At this point, both the switches SW1 and SW2 are turned to the side "a," and the first shot image stored in the frame memory 141 is supplied to and stored in the frame memory section 142 as well as the correlation arithmetic section 143 via the switches SW1 and SW2.

In the correlation arithmetic section 143 in which the first shot image and the second shot image are supplied, a motion vector indicating camera shake is detected using these two images. Upon detection of the motion vector, both the switches SW1 and SW2 are turned to the side "b" under the control of the system control section 110, and location data (e.g., coordinate data x, y) indicating the detected motion vector is supplied to the address shift section 144. At this time, the contents of the frame memory 141 are rewritten to replace the first shot image with the second shot image, and the second shot image in the frame memory 141 is supplied to the address shift section 144 via a contact point "b" of the switch SW1.

In the address shift section 144, since the first shot image is stored in the frame memory section 142, the position of the second shot image is offset to match the position of the first shot image stored in the frame memory section 142. In this way, the second shot image is added to the first shot image to correct blurring. Thus, a superimposed image whose blurring is corrected is stored in the frame memory section 142.

Subsequently, the third shot image, the fourth image and so on are sequentially supplied to the correlation arithmetic section 143 and superimposed on each other with reference to the position of the first shot image stored in the frame memory section 142. A motion vector is then detected based on the currently supplied image and the previously supplied image so that blurring is corrected based on the detected motion vector. In this way, a superimposed image obtained by adding each shot image is written over the existing image in the frame memory section 142.

After addition of each shot image is repeated for the number of images that are obtained during continuous shooting in response to one shooting operation, the switch SW3 is changed from "disconnection" to "connection" according to a switching signal supplied by the system control section 110.

Subsequently, the superimposed image stored in the frame memory 142 is read by an image reading section 161 of the signal processing section 160. Here, based on the result of operation by the correlation arithmetic section 143, a record area having a fixed area ratio to the entire imaging area is set in the image reading section 161 by the system control section 110. An image having the fixed area ratio is cut out and read from the superimposed image in the frame memory section 142 by the image reading section 161.

When the superimposed image is read by the signal processing section 160 shown in FIG. 2, color signals forming the image are selectively separated by a color separating section 162 in the signal processing section 160. At the same time, the color signal representing a certain pixel is interpolated by color signals of pixels around the certain pixel and generated. The color signals are then changed to plain signals for each frame and supplied to a YC conversion section 163 in the subsequent stage.

In the YC conversion section 163, YCC signals are generated based on a transformation matrix and supplied to an image compression section 164 where the YCC signals are compressed. Subsequently, an image file having the compressed YCC signals and compression information is recorded in a recording medium 181 by the recording/reproducing section 180.

As previously described, a high-sensitivity image is stored in the frame memory (not shown) in the preprocessing section 130. Therefore, while a superimposed image is generated, the image reading section 161 in the signal processing section 160 reads the high-sensitivity image from the frame memory (not shown) of the preprocessing section 130 in response to an instruction from the system control section 110. Subsequently, the color separating section 162 of the signal processing section 160 selectively separates color signals forming the image, interpolates the color signal of a certain pixel by the color signals of pixels around the certain pixel, and generates the interpolated color signal. The color signals are then changed to plain signals for each frame and supplied to the YC conversion section 163 in the subsequent stage. In the YC conversion section 163, YCC signals are generated based on a transformation matrix and supplied to the image compression section 164 where the YCC signals are compressed. Subsequently, an image file having the compressed YCC signals and compression information is recorded in the recording medium 181 by the recording/reproducing section 180.

In other words, two kinds of shooting processing for the respective two kinds of images, a high-sensitivity image and an image of relatively low sensitivity, are executed in parallel and the two kinds of images are recorded in a recording medium. Incidentally, the recording/reproducing section 180 reads an image recorded in the recording medium 181 and supplies the read image to an image display section (not shown) so that the image is displayed on the LCD 150.

According to the elements as configured above, two shot images, a high-sensitivity image and a superimposed image of low sensibility, are recorded in a recording medium in response to a single shooting operation. Therefore, it is possible for a photographer to obtain later either a high-sensitivity image in which blurring due to a subject's movement has been suppressed or an image in which blurring due to camera shake has been corrected, depending on the photographed scene.

Now, with reference to FIG. 4(*a*), the process of shooting operation performed by the system control section 110 and the signal processing section 160 will be described.

FIG. 4(*a*) is a flowchart showing the process of shooting operation performed by the system control section 110 and the signal processing section 160. The system control section 110 starts the processing in the flow shown in FIG. 4(*a*) when the release button 102 is pressed halfway while the mode lever 101*e* of the operation section 101 is switched to the shooting mode.

At first, the system control section 110 performs AE processing in step S401 to calculate an aperture value and a shutter speed. When the calculated shutter speed is higher than a predetermined speed, the system control section 110 sets, in the timing generation section 111, the number of shooting times, i.e. the number of images to be shot in continuous shooting, according to the calculated shutter speed. Subsequently, in step S402, AF processing is carried out to place a focus lens at a focal point. Here, at step S403, when the release button 102 is fully pressed, the system control section 110 sets a shutter speed of 1/f (f: focal distance in terms of 35 mm film) which is said to be a shutter speed hardly affected by camera shake and also sets the number of images to be shot with correct exposure, i.e. the number of shooting times in continuous shooting, by accumulating the shutter speed 1/f, in the timing generation section 111. The system control section 110 then causes the imaging section 120 to continuously operate as the electronic shutter via the timing generation section 111, thereby causing the imaging device to continuously execute exposure. Subsequently, in step S404, the system control section 110 causes the imaging section 120 to output an image formed by all pixels per shooting to the preprocessing section 130 so that the CDS 131 of the preprocessing section 130 sequentially executes processing. In the next step S405, the system control section 110 causes the A/D section 132 to execute A/D conversion and causes the camera-shake correction section 140 to sequentially output image data formed by digital color signals. When the system control section 110 determines that shooting of the predetermined number of images is completed, the system control section 110 notifies the signal processing section 160 of the completion, and changes the switch SW3 (see FIG. 3) in the camera-shake correction section 140 from connection to disconnection. The signal processing section 160 then cuts out and reads a portion having a predetermined area ratio from a superimposed image stored in the frame memory section 142 (see FIG. 3). Subsequently, color separation and YCC conversion are performed in step S406, and compression processing is carried out in step S407. When the system control section 110 detects that a series of processes are completed and the signal processing section 160 has set a process ending flag, the system control section 110 causes, in step S408, the recording/reproducing section 180 to create an image file including the compression information and the compressed image and record the image file in the recording medium 181, which ends this flow.

Figure 4A:
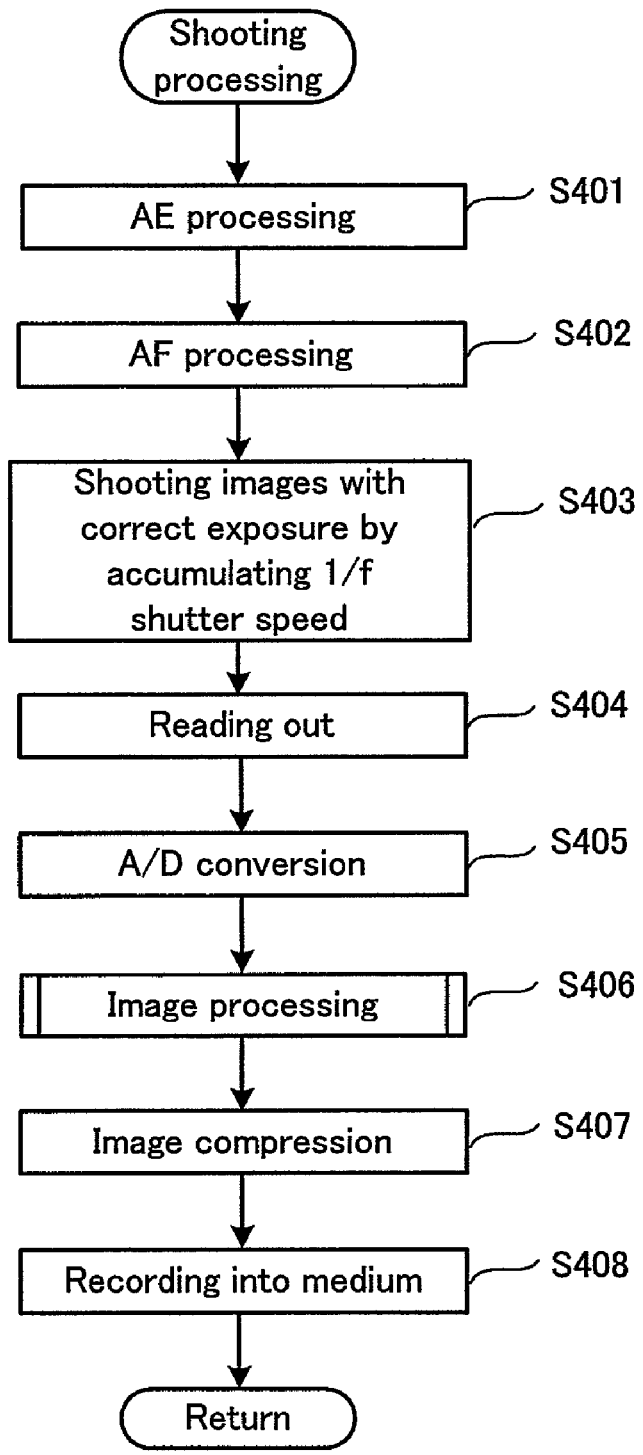
FIG. 4(*a*) is a flowchart showing a procedure of shooting processing executed by a system control section 110 and a signal processing section 160.
Figure 4B:
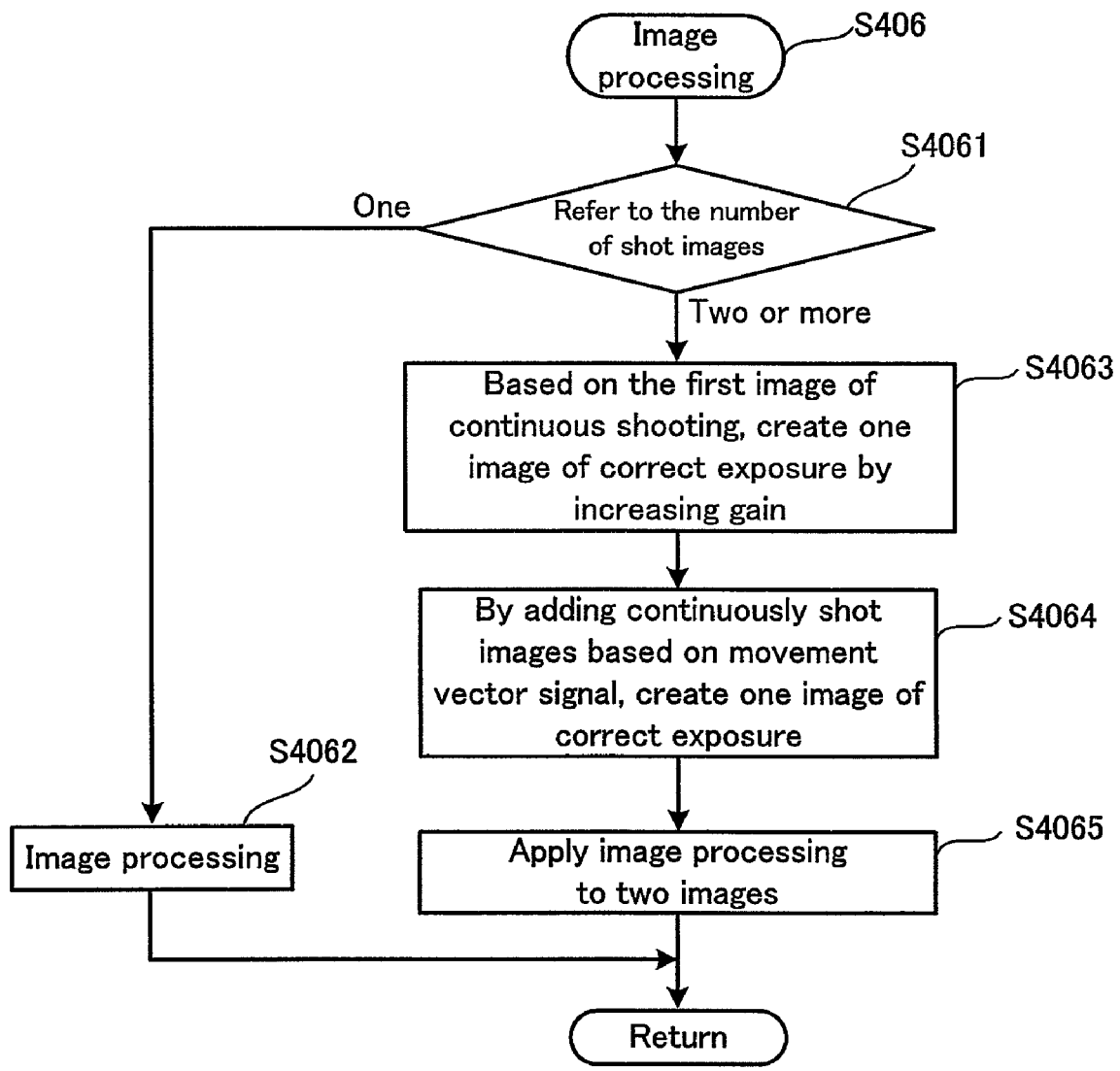

FIG. 4(b) is a flowchart showing the details of the image processing in step S406 shown in FIG. 4(a). Note that the processes in step S4063 and step S4064 are performed in parallel as mentioned above. Therefore, while all continuously shot images are output from the preprocessing section 130 to the camera-shake correction section 140 and correction of camera shake is performed in the camera-shake correction section 140, the gain of the amplifying circuit in the preprocessing section 130 is increased and the amplitude of the first image obtained in the continuous shooting is amplified to a large extent so that a high-sensitivity image is generated. The generated high-sensitivity image is then stored in a frame memory (not shown) of the preprocessing section 130.

Now, the image processing will be described with reference to FIG. 4(b).

When the process in step S406 begins, at first, the system control section 110 refers to the number of images obtained by exposure in step S4061. If it is determined that the number of shot images is one, the flow proceeds to step S4062 where the signal processing section 160 performs image processing such as color separation and YC conversion in step S4062, and returns to step S407 of FIG. 4(a).

On the other hand, if it is determined that the number of images obtained by exposure in step S4061 is two or more, the flow proceeds to step S4063 where the system control section 110 increases the gain of the amplifying circuit in the preprocessing section 130 so that the preprocessing section 130 generates a high-sensitivity shot image based on the first image obtained in continuous shooting that has been stored in the frame memory of the imaging section 120.

Subsequently in step S4064, the correlation arithmetic section 143 is caused to detect a movement vector based on the continuously shot images output beforehand by the camera-shake correction section 140, and the synthesis section 145 is caused to superimpose the continuously shot images on each other based on the detected movement vector, thereby generating a superimposed image.

Finally in step S4065, the signal processing section 160 reads a high-sensitivity shot image from the frame memory of the preprocessing section 130 and the superimposed image of low sensibility from the frame memory section 142 of the camera-shake correction section 140. The signal processing section 160 then applies color separation and YC conversion processing to both images, and the flow returns to step S408.

When the system control section 110 and the signal processing section 160 perform the processing in the flow as described above, two images, a high-sensitivity image in which blurring due to a subject's movement has been suppressed and a superimposed image in which camera shake has been corrected, are recorded in the recording medium. Therefore, when a photographer thinks that blurring due to a subject's movement in a photographed scene is very likely to occur, he/she can select the high-sensitivity image to obtain an image in which blurring due to a subject's movement is suppressed, whereas when the photographer thinks that blurring due to camera shake in a photographed scene is very likely to occur, he/she can select the superimposed image of low sensitivity to obtain an image in which blurring due to camera shake is corrected. After either one is selected, any image in the recording medium can be deleted. Therefore, even if two images exist right after shooting, only one of them may be kept so that the memory of the recording medium is efficiently utilized.

Here, since the digital camera of FIG. 1 is provided with the flash 190, the digital camera may be configured to carry shooting using the flash 190 so as to obtain a flash-based image in which blurring due to a subject's movement is corrected by increasing the shutter speed, instead of generating a high-sensitivity shot image.

Figure 5:
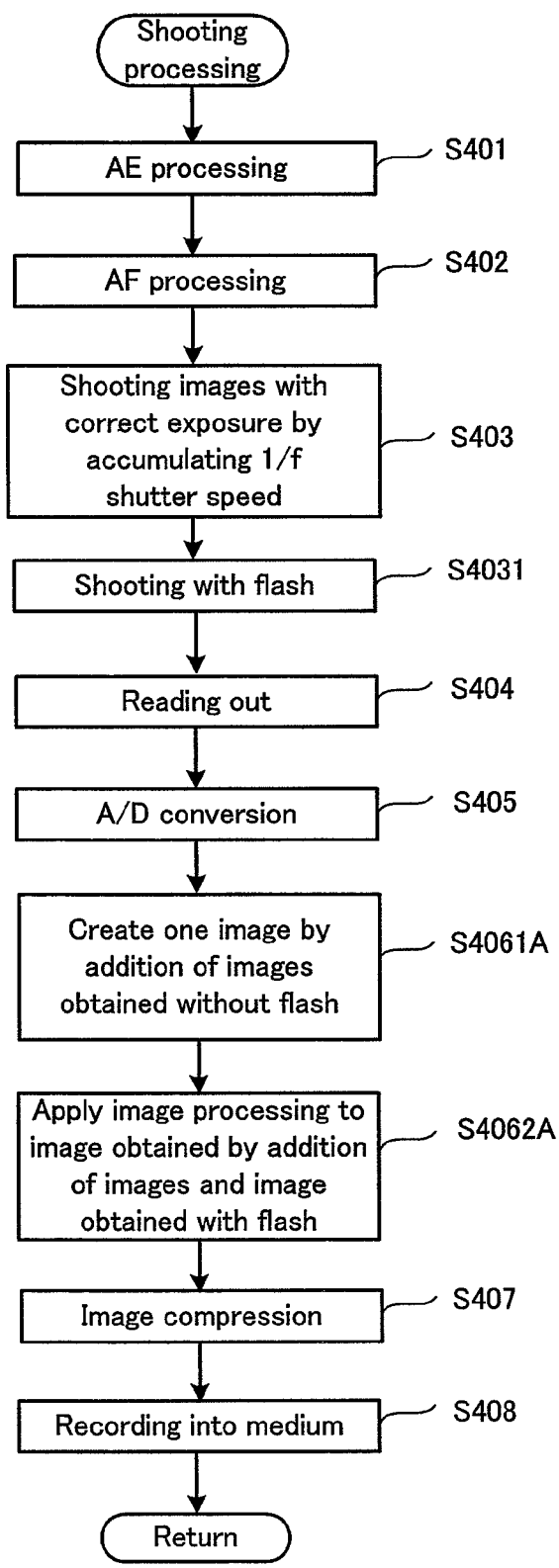
FIG. 5 is a flowchart showing a second embodiment.

FIG. 5 is a flowchart showing a second embodiment.

The digital camera of the second embodiment has an appearance similar to that shown in FIG. 1 and an internal structure similar to that shown in FIG. 2.

The flow shown in FIG. 5 is about the same as the flow shown in FIG. 4(a) except that flash shooting in step S4031 is added and steps S4061A and S4062A are added in place of S406 in FIG. 4(a).

Since the flow shown in FIG. 5 is about the same as the flow shown in FIG. 4(a), only the added steps will be described.

In step S4031, the system control section 110 instructs the timing generation section 111 to start continuous shooting, and also instructs the flash 190 to emit light in synchronism with the shooting of any one of images to be shot.

In step S4061A, the system control section 110 causes the camera-shake correction section 140 to superimpose images shot without a flash on each other thereby generating a superimposed image. Subsequently in step S4062A, the system control section 110 applies image processing to the superimposed image and the image shot with a flash, and causes the recording/reproducing section to record the superimposed image and the image shot with a flash in a recording medium.

The digital camera thus configured can also produce the effects similar to those of the first embodiment.

Incidentally, when the digital camera is configured to constantly record two images as in the above-described embodiments, a large number of images are unnecessarily recorded although they can be deleted later.

Therefore, it is conceivable to provide the correlation arithmetic section 143 and the system control section 110 with the function of the "subject determination section" according to the present invention, in order to avoid recording unnecessary images.

Figure 6A:
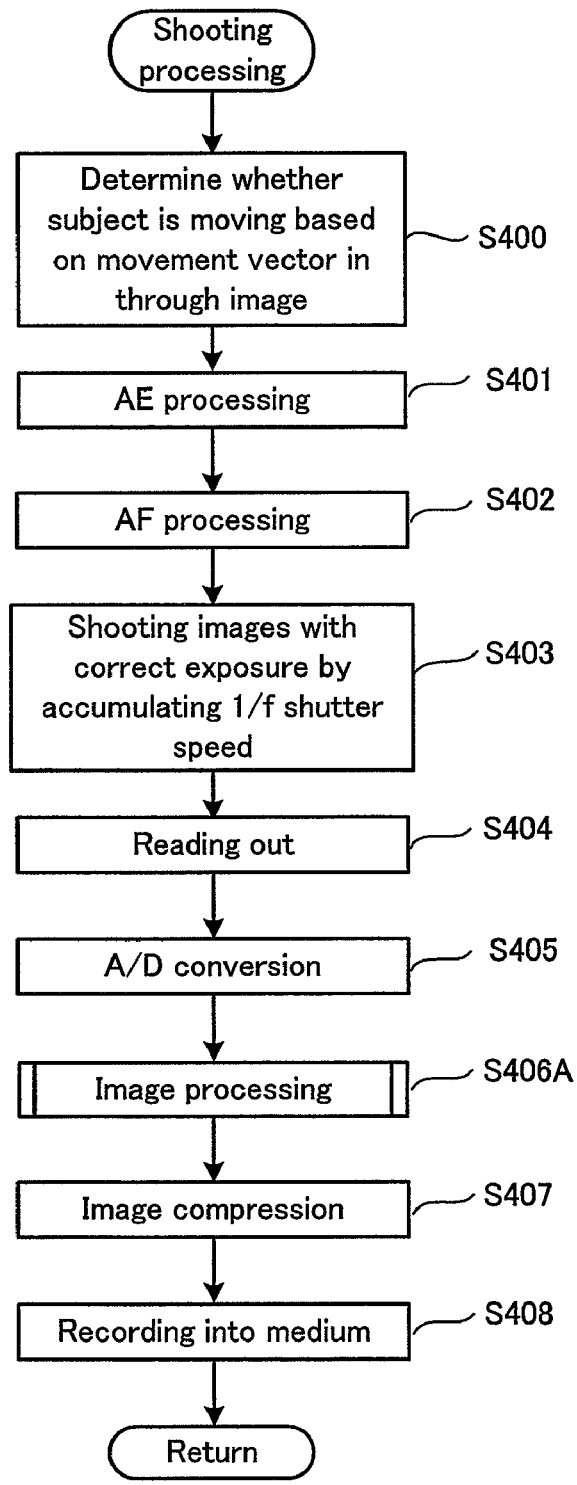
FIG. 6(*a*) is a flowchart showing a third embodiment.
Figure 6B:
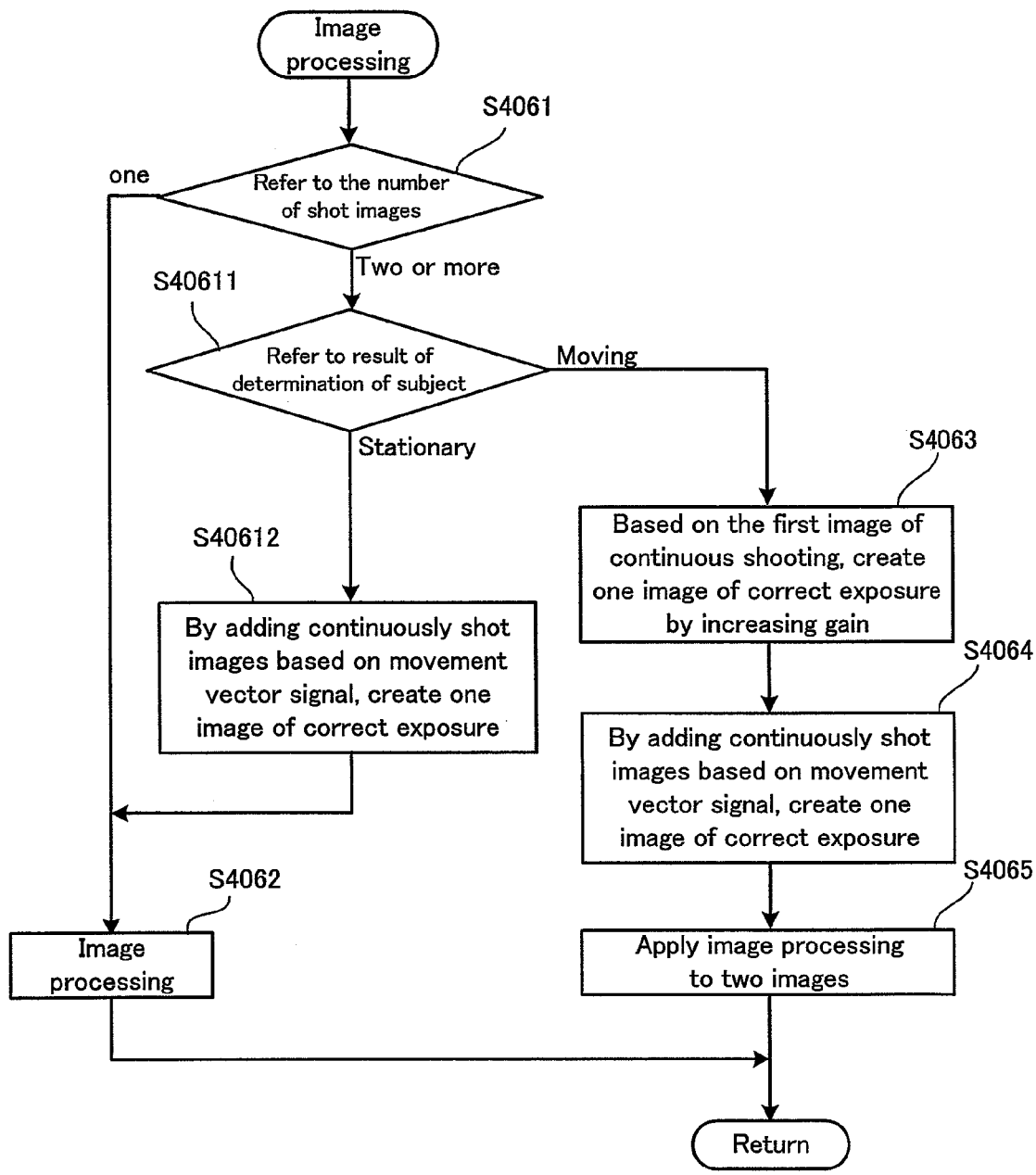

FIG. 6(a) and FIG. 6(b) are flowcharts showing a third embodiment.

FIG. 6(a) is similar to FIG. 4(a) except that step S400 is added and step S406A is included in place of step S406. FIG. 6(b) is similar to FIG. 4(b) except that step S40611 as well as step S40612 executed when it is determined that the subject is stationary in step S40611 are added.

In step S400, the system control section 110 determines whether the subject is moving or stationary based on a movement vector obtained by the correlation arithmetic section 143, and retains the result of the determination in an internal register.

When it is determined that the subject is stationary with reference to the contents of the internal register in step S40611, in the subsequent step S40612, the correlation arithmetic section 143 is caused to superimpose the continuously shot images on each other based on the movement vector obtained by the correlation arithmetic section 143 of the camera-shake correction section 140, so that only a superimposed image of correct exposure is generated. The flow then returns to step S408.

When the system control section 110 and the signal processing section 160 perform the processing in the above-described flow, only a superimposed image is recorded when it is determined that the subject is stationary and thus unnecessary images are not recorded, which prevents, for example, the recording capacity of a portable recording medium from being wasted.

Also, a face detecting means may be provided to determine that the subject is a person which is a moving subject when a face is detected.

Figure 7:
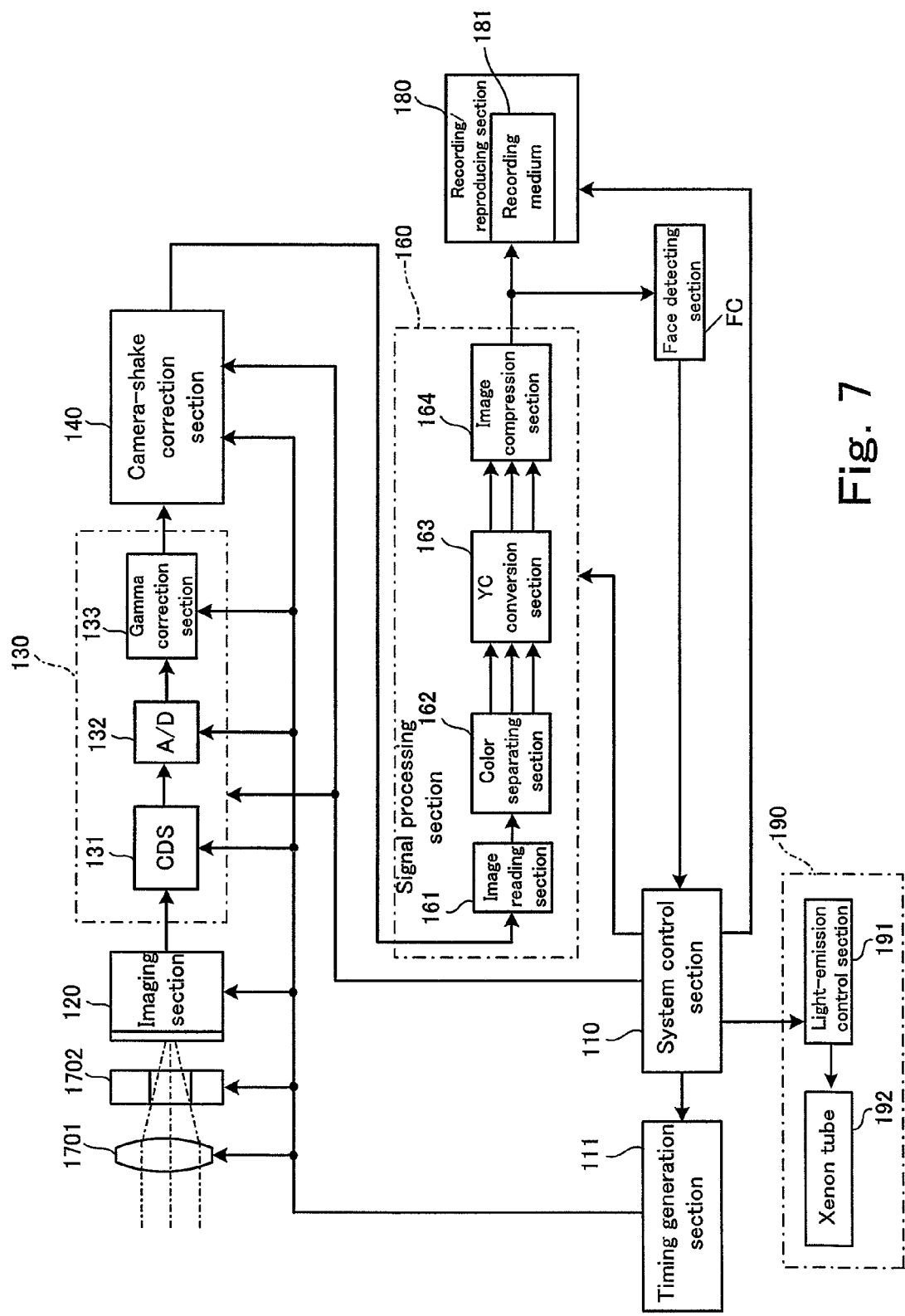
FIG. 7 is a diagram showing a fourth embodiment.
Figure 8:
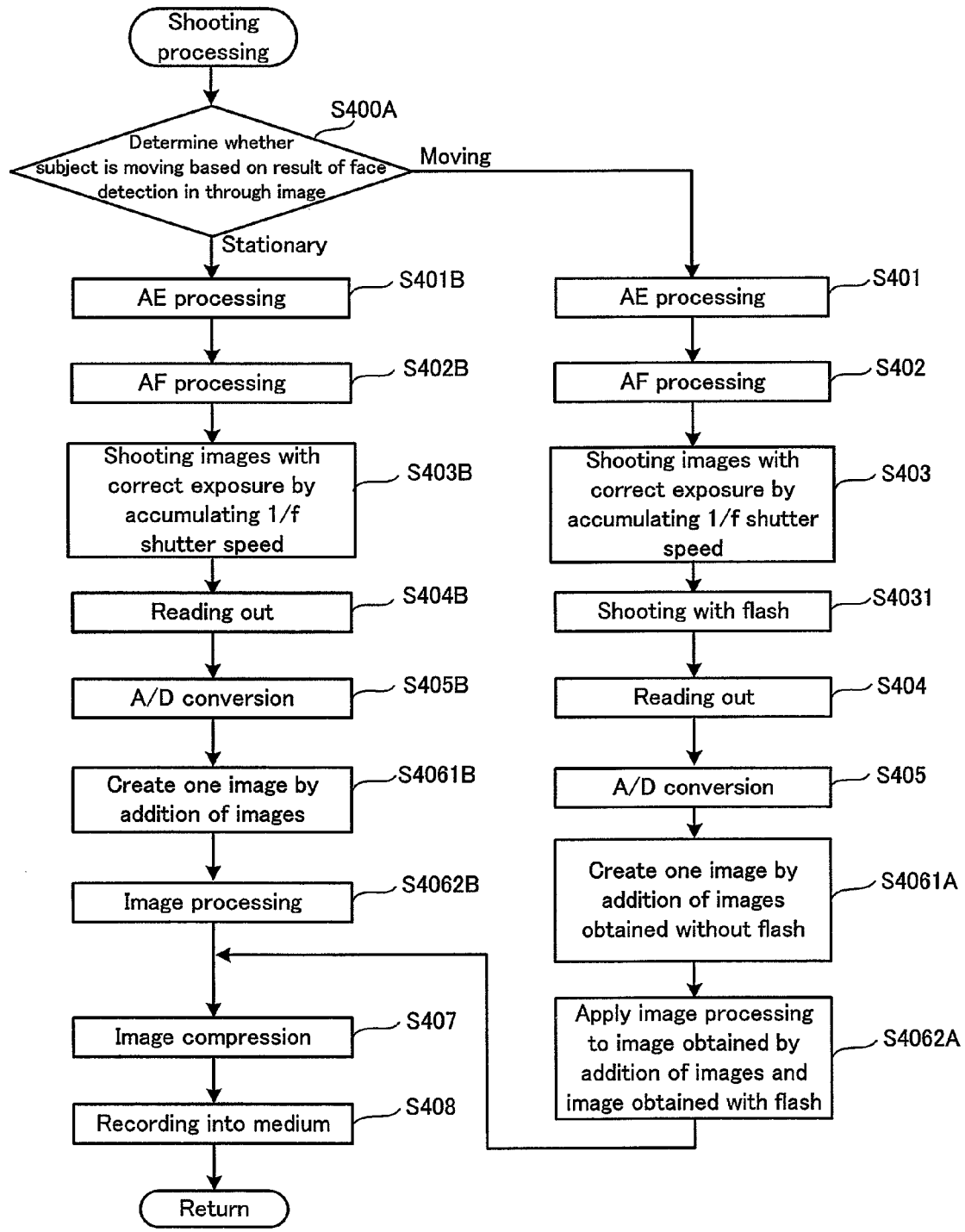
FIG. 8 is a flowchart showing the fourth embodiment.

FIG. 7 and FIG. 8 are flowcharts showing a fourth embodiment.

The digital camera of the fourth embodiment has an appearance similar to that shown in FIG. 1 and an internal structure similar to that shown in FIG. 2.

The internal structure shown in FIG. 7 is the same as that shown in FIG. 2 except that a face detecting section FC is added.

Also, the flow shown in FIG. 8 is similar to FIG. 6(a) except that step S400A is provided in place of step S400 shown in FIG. 6(a) and steps S401B through S4062B executed when it is determined that the subject is stationary in step S400A are added.

When it is determined that the subject is stationary in step S400A, the system control section 110 performs processing in steps S401B through S4062B where the camera-shake correction section 140 generates only a superimposed image and the recording/reproducing section stores only the superimposed image in a recording medium in step S408. Since only a superimposed image is recorded in a recording medium when the subject is stationary, the present embodiment can also prevent the recording capacity of the recording medium from being wasted, thereby effectively utilizing the recording medium.

Figure 9:
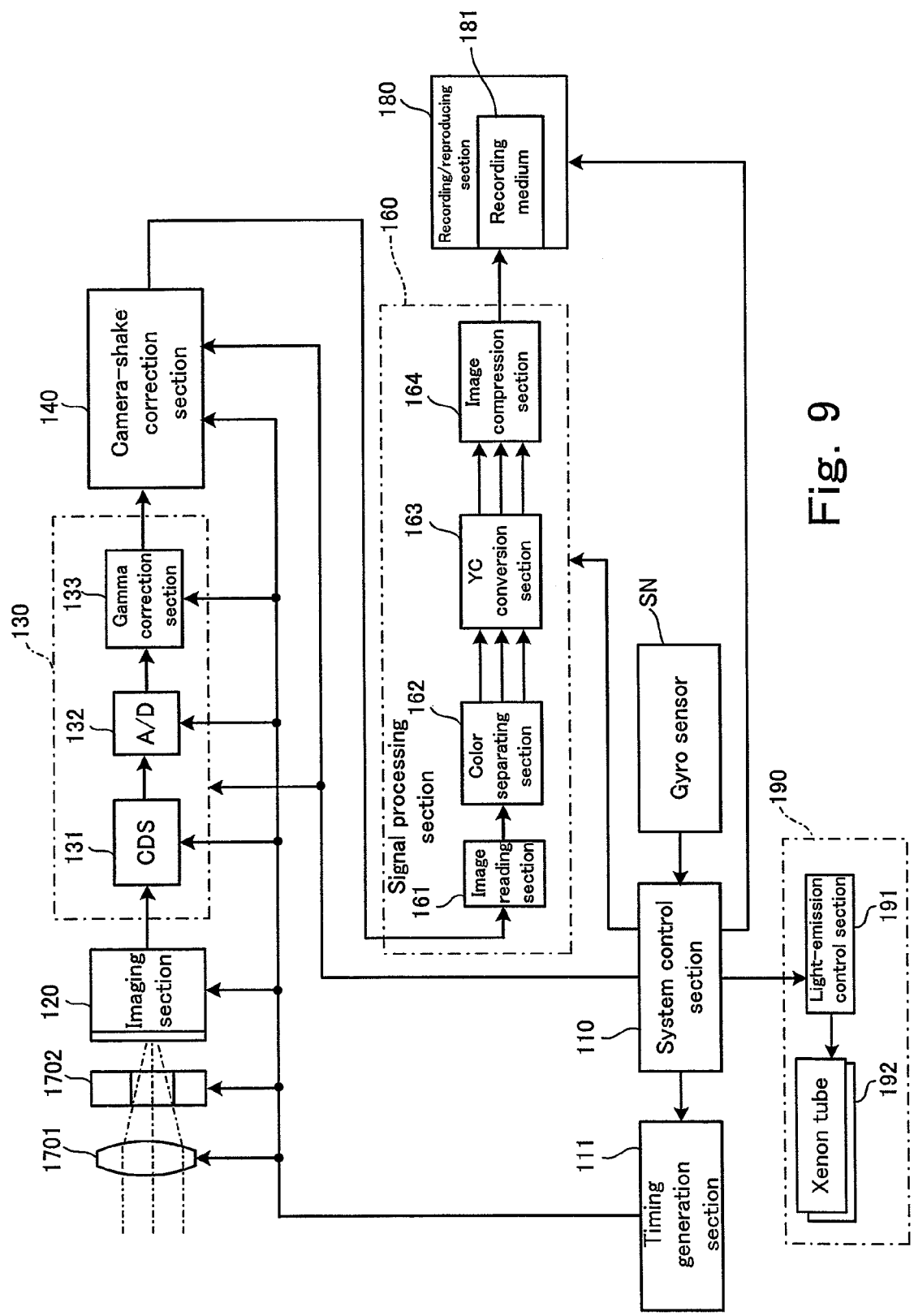
FIG. 9 is a diagram showing a fifth embodiment.
Figure 10A:
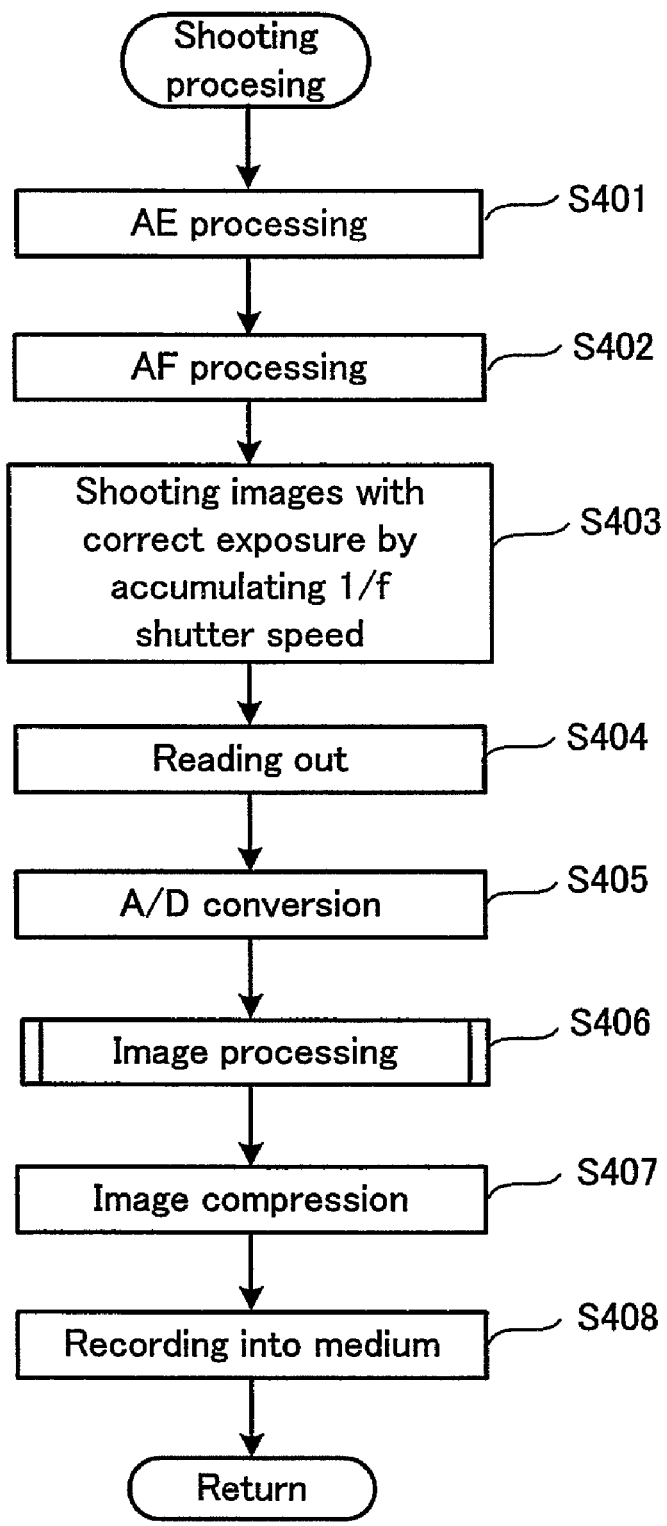
FIG. 10(*a*) is a flowchart showing the fifth embodiment.
Figure 10B:
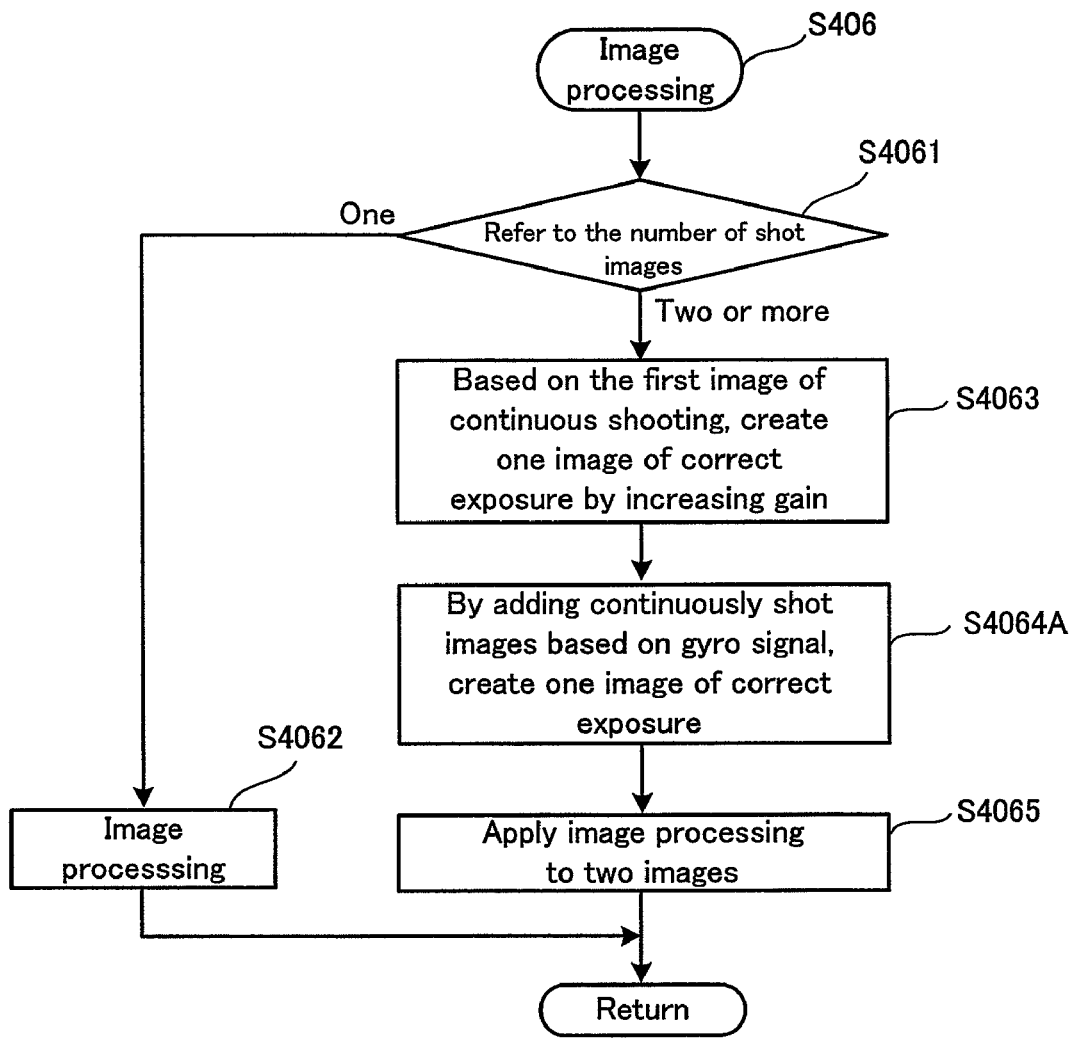

FIG. 9, FIG. 10(a) and FIG. 10(b) illustrate a fifth embodiment.

The configuration shown in FIG. 9 is similar to that shown in FIG. 2 except that a gyro sensor SN is added. The flow shown in FIG. 10(a) is similar to that shown in FIG. 4(a). The flow shown in FIG. 10(b) is similar to that shown in FIG. 4(b) except that step S4064A is provided in place of step S4064 in FIG. 4(b), so that superimposition is carried out based on an angular rate detected by the gyro sensor SN. The digital camera according to the present invention may be thus configured.

What is claimed is:

1. An image-taking apparatus that generates an image representing a subject by using an imaging device, the image-taking apparatus comprising:
    a shooting section that generates an image by shooting;
    a shooting control section that causes the shooting section to generate a plurality of continuously shot images in response to a shooting operation;
    a preprocessing section that causes a predetermined memory to store one of the plurality of continuously shot images generated by the shooting section, and that performs amplifying processing by a predetermined gain on the plurality of continuously shot images generated by the shooting section to output the plurality of continuously shot images on which the amplifying processing is performed;
    a superimposing section that receives the plurality of continuously shot images, on which the amplifying processing is performed by the preprocessing section and which are output from the preprocessing section, and that superimposes the received plurality of continuously shot images on each other so that blurring is corrected, thereby generating one superimposed image;
    a high-sensitivity image generation section that generates a high-sensitivity image which has higher sensitivity than sensitivity of the received plurality of continuously shot images, by performing amplifying processing by a larger gain than the predetermined gain on the one of the plurality of continuously shot images stored by the predetermined memory after the plurality of continuously shot images are output from the preprocessing section to the superimposing section;
    a signal processing section that performs predetermined signal processing including color separating processing and YC conversion processing on the high-sensitivity image generated by the high-sensitivity image section while the superimposing section is generating the one superimposed image, wherein when the superimposing section finishes generating the one superimposed image, the signal processing section also performs the predetermined signal processing on the one superimposed image; and
    an image recording section that records both the superimposed image, on which the predetermined signal processing is performed, and the high-sensitivity image, on which the predetermined signal processing is performed.

2. The image-taking apparatus according to claim 1, further comprising a subject determination section that determines whether a subject is moving or stationary,
    wherein the image recording section records both the superimposed image and the image of high sensitivity when it is determined by the subject determination section that the subject is moving, and records only the superimposed image when it is determined by the subject determination section that the subject is stationary.

3. The image-taking apparatus according to claim 2, wherein the subject determination section determines whether a subject is moving or stationary by detecting a movement vector based on a moving image before shooting.

4. The image-taking apparatus according to claim 2, wherein the subject determination section detects whether a face is included in a subject, and determines that the subject is moving when the face is included and that the subject is stationary when the face is not included.

5. The image-taking apparatus according to claim 1, further comprising a movement-vector calculation section that calculates a movement vector based on the received plurality of continuously shot images, wherein the superimposing section superimposes the received plurality of continuously shot images on each other based on the movement vector calculated by the movement-vector calculation section so that the blurring is corrected.

6. The image-taking apparatus according to claim 1, further comprising an angular velocity sensor that detects an angular velocity of the image-taking apparatus, wherein the superimposing section superimposes a plurality of images obtained by a single shooting operation on each other based on the angular velocity detected by the angular velocity sensor so that blurring is corrected.

7. An image-taking method that generates an image representing a subject, the image-taking method comprising:

generating an image by shooting;

generating a plurality of continuously shot images in response to a shooting operation;

storing, at a memory, one of the plurality of continuously shot images, and performing amplifying processing by a predetermined gain on the plurality of continuously shot images to output the plurality of continuously shot images on which the amplifying processing is performed;

receiving the plurality of continuously shot images, on which the amplifying processing is performed and which are output, and superimposing the received plurality of continuously shot images on each other so that blurring is corrected, thereby generating one superimposed image;

generating a high-sensitivity image which has higher sensitivity than sensitivity of the received plurality of continuously shot images, by performing amplifying processing by a larger gain than the predetermined gain on the one of the plurality of continuously shot images stored by the memory after the plurality of continuously shot images are output;

performing predetermined signal processing including color separating processing and YC conversion processing on the high-sensitivity image while said generating of the one superimposed image is performed, wherein when said generating the one superimposed image is finished, the predetermined signal processing is performed on the one superimposed image; and recording both the superimposed image, on which the predetermined signal processing is performed, and the high-sensitivity image, on which the predetermined signal processing is performed.

8. The image-taking method according to claim 7, further comprising calculating a movement vector based on the received plurality of continuously shot images, wherein the received plurality of continuously shot images are superimposed on each other based on the calculated movement vector so that the blurring is corrected.

* * * * *